United States Patent [19]
Yoshimura et al.

[11] 4,390,587
[45] Jun. 28, 1983

[54] LOW-TEMPERATURE, SHRINKAGE GAS-BARRIER MULTILAYERED FILM

[75] Inventors: Isao Yoshimura, Fujisawa; Takao Togashi, Suzuka, both of Japan

[73] Assignee: Asahi-Dow Limited, Tokyo, Japan

[21] Appl. No.: 271,191

[22] Filed: Jun. 8, 1981

[30] Foreign Application Priority Data

Jun. 16, 1980 [JP] Japan ................... 55-80252

[51] Int. Cl.³ .................. B65D 25/06; B32B 27/08
[52] U.S. Cl. ................... 428/215; 428/220; 428/516; 428/518; 428/520; 428/35; 426/129
[58] Field of Search ............... 428/220, 215, 516, 518, 428/520

[56] References Cited

U.S. PATENT DOCUMENTS 3,891,008  6/1975  D'Entremont ............... 428/518
4,178,401 12/1979 Weinberg et al. ............ 428/35
4,207,363  6/1980 Lustig et al. ............... 428/518
4,247,584  1/1981 Widiger et al. .............. 428/35
4,277,578  7/1981 Yoshimura et al. ........... 525/211

*Primary Examiner*—P. Ives
*Attorney, Agent, or Firm*—Armstrong, Nikaido, Marmelstein & Kubovcik

[57] ABSTRACT

Disclosed is a low-temperature shrinkage multilayered film incorporating a gas barrier layer formed of a vinylidene chloride type resin. This film exhibits low-temperature shrinkage properties (shrinkage and shrink tension), low-temperature toughness, seal strength properties (seal resistance to oil, seal resistance to heat and drop-bag seal strength at low-temperatures), gas barrier property, transparency after heating, resistance to layer delamination, airtightness in clipped state and gloss invariably at high levels.

32 Claims, 6 Drawing Figures

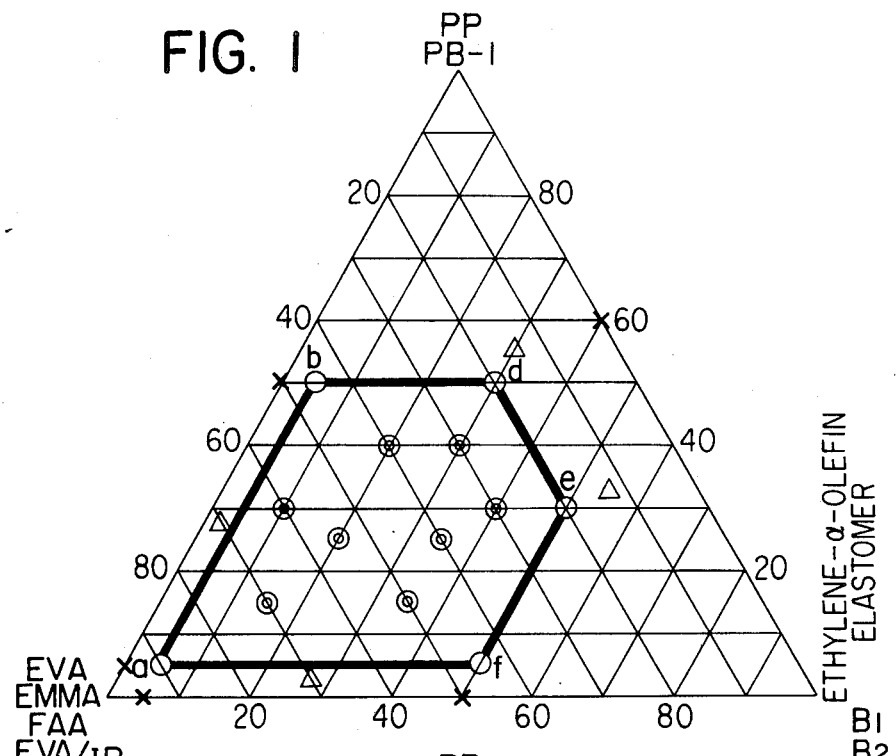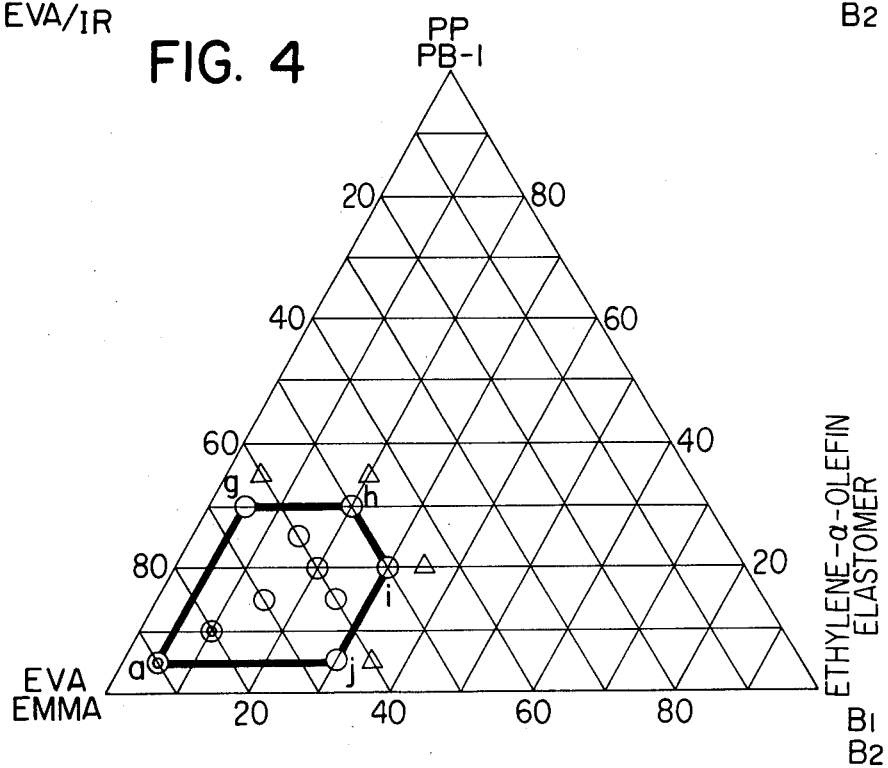

LOW-TEMPERATURE, SHRINKAGE GAS-BARRIER MULTILAYERED FILM

BACKGROUND OF THE INVENTION

This invention relates to a low-temperature heat shrinkage multilayered film incorporating a gas barrier layer of a vinylidene chloride type resin. More particularly this invention relates to a novel heat shrinkage multilayered film which exhibits low-temperature heat shrinkage properties (shrinkage and shrink tension), low-temperature toughness, seal strength (seal resistance to oil, seal resistance to heat and drop-bag seal strength at low temperature), gas barrier property, transparency after heat shrinkage, resistance to layer delamination, air-tightness in the clipped state and specular gloss all at high levels.

Heat shrinkage films available for tightly wrapping commodities have long been known. Needs have arisen which expect these films to possess those properties underivable from the resins making up the films. The needs could be met by depositing on these films a suitable combination of layers formed of other resins capable of manifesting the desired properties thereby producing multilayered films which combine the properties possessed severally by the newly added resin layers and those possessed by the original films. Many researches are now under way toward developing multilayered films which meet the needs.

The film properties expected to meet the needs of the market are greatly diversified and increasingly exacted. In contrast, the properties collectively derivable from the component resin layers in multilayered films have their own limits. Besides, the selection of resins for the formation of multilayered films has various restrictions. The unfilled gap between the needs of the market and the properties of the existing films continues to widen. In the circumstance, the appearance of multilayered films capable of fulfilling the exacting needs of the market is strongly in need.

In the field of films used for tightly wrapping fatty foodstuffs such as raw meat, processed meat and cheese, for example, low-temperature shrinkage properties (shrinkage and shrink tension) and gas barrier property currently form targets for special requirements. This is because these fatty foodstuffs in most cases are irregular in shape and have projecting corners, bones and inner packaging materials and the films, when desired to wrap them all up with ample tightness, are required to produce high shirnkage in conjunction with high shrink tension. When the manifestation of these shrinkage properties deviates toward a high-temperature range and has firm dependency upon temperature conditions, the foodstuffs being wrapped are impaired in color and quality or the films sustain wrinkles and sagging because of the phenomenon of uneven shrinkage resulting from uneven temperature distribution. These defects persist on the surface of wrapped products. The low-temperature heat shrinkage films, therefore, are required to remain stably at their normal storage temperatures and, at the same time, manifest their shrinkage properties in a low-temperature range and have no conspicuous dependency on temperature conditions. The gas barrier property which is additionally expected of the films forms a requirement indispensable to prolonged preservation of wrapped commodities. The shrink wrapping of fatty foodstuffs cannot be considered without this particular property.

If a certain film which fulfils the two sets of properties described above lacks transparency and specular gloss or loses transparency (hazing) after heat shrinkage, the wrapped products are impaired in appearance (product value). In the case of a film which is deficient in seal strength, resistance to layer delamination, air-tightness in clipped state or toughness needed for low-temperature handling, it fails to discharge the role as a wrapping material for preserving contained foodstuffs for a long time. In the market, therefore, collective fulfilment of all these properties forms a major target for quality requirements. On the part of producers engaging in the supply of multilayered films, design of film compositions capable of satisfying all these properties is extremely difficult from the technical point of view. Thus, the producers are inevitably content with an awkward situation wherein they are compelled to give up some of these essential properties in the manufacture of their films.

Films of vinylidene chloride type resins have found popular acceptance for their superior gas barrier property. They are not faultless, for they are deficient in low-temperature shrinkage, low-temperature toughness, heat seal property, etc. An attempt may be made to relieve this drawback by laminating layers of other resins on such films and enriching their original gas barrier property with the properties of such other resins. To impart the low-temperature shrinkage (low-temperature drawing property) to the films, adoption of the manufacturing process of coextrusion and continued drawing is an inevitable requirement. The adoption of this process ushers in a separate problem that the resins of the newly added layers are required to possess adaptability to the coextrusion with vinylidene chloride type resins used originally and to low-temperature drawing. Particularly, vinylidene chloride type resins lack thermal stability and permit melt extrusion in a narrow low-temperature range. They further involve a problem of poor adhesion with layers of other resins, a problem of heavy loss of drawability due to advance of crystallization, a problem of large evolution of heat during the drawing, and so on. Thus, the selection of other resins capable of imparting desired low-temperature shrinkage properties to the multilayered films of vinylidene chloride type resins becomes extremely difficult because of many restrictions to be entailed. This explains why producers are forced to yield, unwillingly, to the awkward situation that they inevitably give up some of the essential properties in the manufacture of their films.

SUMMARY OF THE INVENTION

This invention has been perfected as the result of a diligent study continued for a very long time with a view to overcoming the difficulties suffered to date in the field of multilayered films.

The first object of this invention is to provide a multilayered film which exhibits low-temperature shrinkage properties including permeability of not more than 20 (cc/25 $\mu$/m$^2$.24 hr.atm) as measured at 23° C. (calculated for barrier layer thickness), thermal shrinkage of not less than 18% and 25% respectively at 70° C.×4 seconds and 80° C.×4 seconds and maximum shrink tension of at least 100 g/mm$^2$ in the temperature range of 60° C. to 80° C.

The second object of this invention is to provide heretofore unheard-of elimination of the specific detrimental phenomenon called zigzag hazing.

The third object of this invention is to provide a multilayered film of vinylidene chloride type resin which exhibits dart impact strength (a property representing low-temperature toughness, measured at 5° C. for film thickness of 60μ) of not less than 150 kg-cm, a value hardly attainable by any multilayered films of its kind.

The fourth object of this invention is to provide a multilayered film which exhibits seal strength properties (seal resistance to oil, seal resistance to heat and drop-bag seal strength), resistance to layer delamination, transparency after shrinkage, airtightness in clipped state, specular gloss and other properties at levels fully satisfactory for practical use.

The fifth object of this invention is to provide a multilayered construction which permits economic and stable supply of multilayered films fulfilling all the four objects described above.

These objects of this invention can easily be attained by satisfying the essential requirements for the construction of this invention.

The first version of the present invention provides a low-temperature shrinkage, gas-barrier multilayered film, comprising in combination the layers of the following polymers:

Resin A, which is a copolymer of ethylene and a monomer selected from the group consisting of vinyl esters, unsaturated aliphatic carboxylic acids and alkyl esters of unsaturated aliphatic carboxylic acids, or a metal-crosslinked copolymer of ethylene and the said selected monomer or a mixture of such copolymers, Resin B, which is a soft copolymer elastomer, i.e. an ethylene-α-olefin copolymer having density of not more than 0.91 g/cm$^3$ and Vicat softening point of not more than 70° C., Resin C, which is crystalline polypropylene or crystalline polybutene-1 or a mixture of the two polymers, Resin D, which is a mixture of the three polymers defined above as Resins A, B and C, the weight proportions of the components A, B and C falling within the respective ranges of 90 to 20%, 50 to 5% and 50 to 5%, based on the total weight of (A+B+C), and Resin E, which is a vinylidene chloride type copolymer exhibiting crystal melting peak value at a temperature within the range of from 140° to 155° C. as measured by the DSC method and solution viscosity within the range of from 1.05 to 0.85 c.p., said film having a multilayer construction represented by the layer combination of (D/E/D), said E layer having a thickness within the range of from 5 to 25μ and accounting for a proportion within the range of from 5 to 35% based on the total thickness, 30 to 100μ, of all the layers involved.

The second version of this invention provides a low-temperature shrinkage, gas-barrier multilayered film, comprising in combination the layers of the following polymers:

Resin A, which is a copolymer of ethylene and a monomer selected from the group consisting of vinyl esters, unsaturated aliphatic carboxylic acids and alkyl esters of unsaturated aliphatic carboxylic acids, or a metal-crosslinked copolymer of ethylene and the said selected monomer or a mixture of such copolymers, Resin B, which is a soft copolymer elastomer, i.e. an ethylene-α-olefin copolymer having density of not more than 0.91 g/cm$^3$ and Vicat softening point of not more than 70° C., Resin C, which is crystalline polypropylene or crystalline polybutene-1 or a mixture of the two polymers, Resin D, which is a mixture of the three polymers defined above as Resins A, B and C, the weight proportions of the components A, B and C falling within the respective ranges of 90 to 20%, 50 to 5% and 50 to 5%, based on the total weight of (A+B+C), and Resin E, which is a vinylidene chloride type copolymer exhibiting crystal melting peak value at a temperature within the range of from 140° to 155° C. as measured by the DSC method and solution viscosity within the range of from 1.05 to 0.85 c.p., said film having a multilayered construction represented by the layer combinations of (D/E/D/A or C) and (A or C/D/E/D/A or C), said E layer having a thickness within the range of from 5 to 25μ and accounting for a proportion within the range of from 5 to 35% based on the total thickness, 30 to 100μ, of all the layers involved and said A or C layer (the sum of the two layers when they are both present) having a thickness within the range of from 2 to 25μ and accounting for a proportion within the range of from 5 to 40% based on the total thickness, 30 to 100μ, of all the layers involved.

BRIEF DESCRIPTION OF THE DRAWING

FIG. 1 is a ternary diagram showing the percentage composition of Resin D, usable for combination with the vinylidene chloride type resin in the formation of the multilayered film of the present invention.

FIG. 2 representing a normal product (Test Piece No. 46 dealt with in a working example of this invention) and FIG. 3 a zigzag deformed product (Test Piece No. 49 dealt with in comparative experiment).

FIG. 4 is a ternary diagram showing the percentage composition of the specific component resin, Dx, selected from Resin D.

FIG. 5 representing the data on thermal shrinkage and FIG. 6 those of shrink tension.

DETAILED DESCRIPTION OF THE INVENTION

Figure 2:
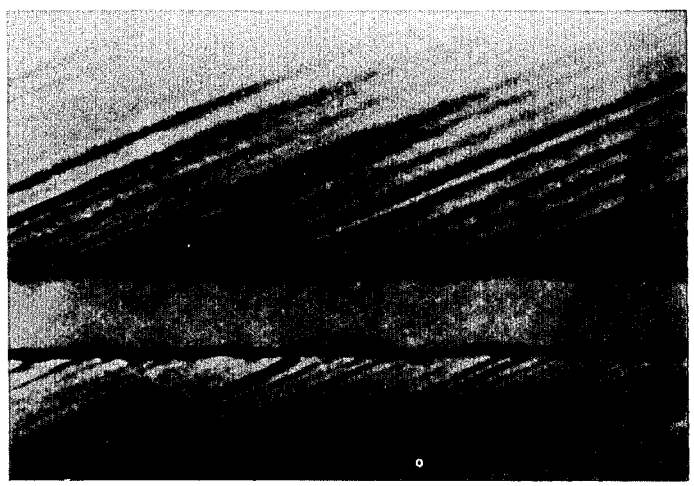
FIGS. 2 and 3 are photographs showing the enlarged cross sections of multilayered films.

FIG. 1 is a diagrammatic representation of the results of evaluation shown in Table 1, i.e. the results of the comprehensive evaluation of the fundamental properties such as adaptability for coextrusion, low-temperature shrinkage properties, seal strength properties and dart impact strength which are indispensable to the completion of the multilayered film of this invention. In this diagram, the percentage compositions of the component resins found as perfectly satisfactory are indicated by the mark ⊚, those found as fairly satisfactory by the mark ○, those found as unsatisfactory by the mark Δ and those found as highly unsatisfactory by the mark ×.

According to the data of FIG. 1, it is seen that for Resin D to be usable for combination with the vinylidene chloride type resin film in the formation of the multilayered film of this invention, it is required to be a mixture of the three resins, Resins A, B and C. It is noted further that if Resin D lacks any one of the three resins, Resins A, B and C, it exhibits unsatisfactory properties.

When the percentage compositions of the components of Resin D usable for combination with the vinylidene chloride type resin are plotted in a ternary diagram, it is seen from the diagram that those evaluated as satisfactory fall within the pentagonal area to be formed by connecting the five points, a (90, 5, 5), b (45, 5, 50), d (20, 30, 50), e (20, 50, 30) and f (45, 50, 5) with straight lines.

In other words, Resin D is a mixture of Resin A represented by a copolymer of ethylene and a monomer selected from the group consisting of vinyl esters, unsaturated aliphatic carboxylic acids and alkyl esters of unsaturated aliphatic carboxylic acids, or a metal-cross-linked copolymer of ethylene and the said selected monomer (ethylenic ionomer) or a mixture of such copolymers, Resin B represented by an ethylene-α-olefin copolymer and Resin C represented by crystalline polypropylene or crystalline polybutene-1 or a mixture of the two polymers, combined in amounts such that the proportion of Resin A falls within the range of from 90 to 20% by weight, that of Resin B within the range of from 50 to 5% by weight and that of Resin C within the range of from 50 to 5% by weight, respectively based on the total of the three resins.

Compared with the known mixed resin disclosed in Japanese Laid-open Patent Publication No. 55071/1979, this mixed resin, Resin D, has very rigid limits as to the proportions of its component resins. When Resin D is used in conjunction with the vinylidene chloride type resin (VDC) in a multilayer construction indicated as D/(VDC)/D, its adaptability for coextrusion and low-temperature drawing proves to be satisfactory. Consequently, the produced multilayered film enjoys good low-temperature shrinkage properties.

The component resins, namely Resins A, B and C, which are specified above prove more effective in the production of the multilayered film of this invention when they satisfy the addition requirements that Resin A be a copolymer having an ethylene content within the range of from 88 to 98 mol% and having melt index within the range of from 0.2 to 10 g/10 minutes, that Resin B be a soft elastomer having density of not more than 0.91 g/cm³ and Vicat softening point of not more than 70° C. or preferably be a thermoplastic elastomer consisting of 40 to 93 mol% of ethylene and 60 to 7 mol% of an elastomeric copolymer formed preponderantly of propylene, butene-1 and having melt index within the range of from 0.1 to 10 g/10 minutes, and that Resin C be a rigid polymer having Vicat softening point of not less than 100° C.

It has been ascertained that the multilayered film of the layer construction represented by D/(VDC)/D encounters a difficult problem.

Figure 3:
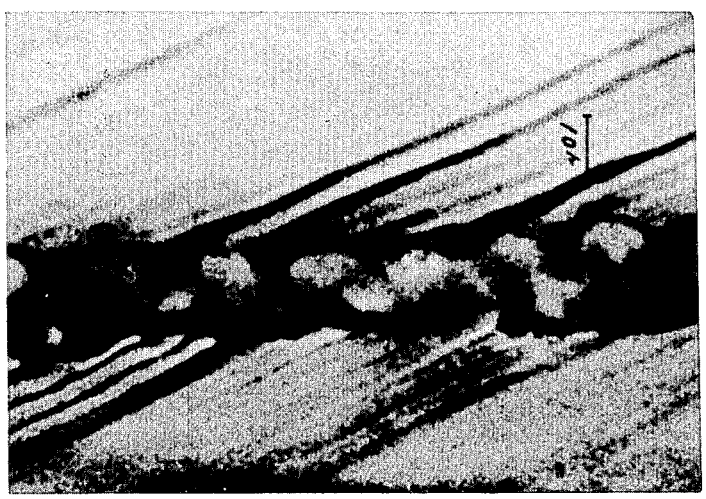

FIGS. 2 and 3 are photographs showing enlarged cross sections of multilayered films, FIG. 2 representing a normal film and FIG. 3 a film affected by the phenomenon of zigzag deformation. The difference in the two films resides in the fact that the VDC layer in the multilayered film in the photograph of FIG. 2 is flat, while that in the photograph of FIG. 3 is deformed in a zigzag.

This phenomenon of the zigzag deformation of a component layer is different from the phenomenon of ordinary hazing which occurs in the form of sudden change of color in a multilayered film when the film is exposed to the heat used for shrinkage of the film. In this phenomenon, hazing occurs throughout the entire film because of the abnormal deformation of the VDC layer as seen in FIG. 3. Here, the designation "zigzag hazing" is adopted to distinguish this particular phenomenon from the phenomenon of ordinary hazing of resin.

Occurrence of this zigzag hazing depends, for example, on the volume of heat applied to the film. When a given film is shrunken rather gradually, it experiences no zigzag hazing. When the same film is shrunken suddenly, it undergoes zigzag hazing. This is a peculiar, unheard-of phenomenon.

The true cause for the zigzag hazing has not been fully accounted for. The difference in thermal shrinkage (shrink tension), rigidity and adhesive force which possibly occurs between the D layer and the VDC layer is believed to be responsible for the phenomenon.

In the multilayered film of the present invention, elimination of this peculiar phenomenon is accomplished by fulfilling the following two conditions:

Resin D should be subjected to a more exacting limitation. (The resin satisfying this requirement will be referred to as Dx for distinction.)

Resin VDC should be subject to a more exacting specification of properties. (Resin E satisfies this requirement.)

FIG. 4 diagrammatically shows the percentage compositions of the specific component resin Dx which is selected from Resin D.

FIG. 4 shows the data obtaned by plotting the results of zigzag hazing evaluation shown in Table 2 with reference to the percentage composition of the components of Resin D.

TABLE 2

| Test specimen No. | Resin D |   |   | Blended ratio (wt %) |   |   | Zigzag hazing |   |
|---|---|---|---|---|---|---|---|---|
|   | A | B | C | A | B | C | Test I | Test II |
| 3 | A₁ | B₁ | C₁ | 90 | 5 | 5 | ◎ | Δ |
| 33 | " | " | " | 80 | 10 | 10 | ◎ | Δ |
| 5 | " | " | " | 70 | 15 | 15 | O | Δ |
| 34 | " | " | " | 65 | 5 | 30 | O | Δ |
| 35 | " | " | " | 65 | 30 | 5 | O | Δ |
| 36 | " | " | " | 60 | 5 | 35 | Δ | X |
| 37 | " | " | " | 60 | 15 | 25 | O | Δ |
| 38 | " | " | " | 60 | 25 | 15 | O | Δ |
| 39 | " | " | " | 60 | 35 | 5 | Δ | X |
| 40 | " | " | " | 50 | 20 | 30 | O | Δ |
| 41 | " | " | " | 50 | 30 | 20 | O | Δ |
| 42 | " | " | " | 45 | 20 | 35 | Δ | X |
| 43 | " | " | " | 45 | 35 | 20 | Δ | X |
| 19 | A₂ | B₁ | C₁ | 70 | 15 | 15 | O | Δ |
| 44 | " | " | " | 60 | 20 | 20 | O | Δ |
| 27 | A₁ | B₂ | C₁ | 70 | 15 | 15 | O | Δ |
| 30 | A₁ | B₁ | C₂ | 70 | 15 | 15 | O | Δ |

According to the data of FIG. 4 and Table 2, it is seen that Resin Dx is effective in preventing the occurrence of zigzag hazing when it is produced by selecting as Resin A a copolymer consisting of ethylene and a vinyl ester or an alkyl ester of an unsaturated aliphatic carboxylic acid and having an ethylene content within the range of from 88 to 98 mol% and melt index within the range of from 0.2 to 10 g/10 minutes, as Resin B a thermoplastic elastomer consisting of 40 to 93 mol% of ethylene and 60 to 7 mol% of a copolymer formed preponderantly of propylene, butene-1 and having density of not more than 0.91 g/cm$^3$, Vicat softening point of not more than 70° C. and melt index within the range of from 0.1 to 10 g/10 minutes and as Resin C a rigid polymer comprising crystalline polypropylene, crystalline polybutene-1 or a mixture of the two polymers and having Vicat softening point of not less than 100° C., and mixing the selected resins A, B and C in amounts such that the percentage compositions of the component resins fall within the pentagonal area formed within the ternary diagram by connecting the five sets of coordinates, a (90, 5, 5), g (65, 5, 30), h (50, 20, 30), i (50, 30, 20) and j (65, 30, 5) by straight lines.

In other words, Resin Dx is required to have Component A account for a proportion within the range of from 90 to 50%, Component B within the range of from 30 to 5% and Component C within the range of from 30 to 5%, respectively, based on the total of the three components taken as 100%.

In the combination of Dx resin of the foregoing description and Resin VDC, the phenomenon of zigzag hazing can be prevented at least when the shrinkage of the film proceeds at a relatively low rate.

Table 3 contains the results indicating desirable percentage compositions of the components of Resin E selected from Resin VDC for combination with Resin Dx. The data of Table 3 have been obtained on the criterion that the zigzag hazing is prevented when it is effected whether the shrinkage of film occurs gradually or abruptly. Since the essential properties of Resin VDC such as gas barrier property, shrinkage properties and coextrudability are affected by the variation of the composition, they are also evaluated in the table.

TABLE 3

| Test specimen No. | Symbol | Resin E DSC peak temperature (°C.) | Sol. vis. (c.p.) | Low-temperature shrinkage properties Shrinkage | Shrink tension | Dart impact strength | Gas barrier property | Zigzag hazing Test I | Test II | Fluctuation of thickness and width | Overall rating |
|---|---|---|---|---|---|---|---|---|---|---|---|
| 5 | VDC-1 | 158 | 0.92 | ◉ | ◉ | ◉ | ◉ | ○ | △ | △ | △ |
| 45 | E$_1$ | 155 | " | ◉ | ◉ | ◉ | ◉ | ◉ | ○ | ◉ | ◉ |
| 46 | E$_2$ | 146 | " | ◉ | ◉ | ◉ | ◉ | ◉ | ◉ | ◉ | ◉ |
| 47 | E$_3$ | 140 | " | ◉ | ◉ | ◉ | ◉ | ◉ | ○ | ○ | ◉ |
| 48 | VDC-2 | 137 | " | ◉ | ◉ | △ | ○ | ○ | △ | △ | △ |
| 49 | VDC-3 | 146 | 1.08 | ◉ | ◉ | ◉ | △ | △ | X | ○ | X |
| 50 | E$_4$ | " | 1.05 | ◉ | ◉ | ◉ | ◉ | | ○ | ○ | ○ |
| 46 | E$_2$ | " | 0.92 | ◉ | ◉ | ◉ | ◉ | ◉ | ◉ | ◉ | ◉ |
| 51 | E$_5$ | " | 0.85 | ◉ | ◉ | ○ | ◉ | ◉ | ◉ | ◉ | ◉ |
| 52 | VDC-4 | " | 0.82 | — | — | — | — | — | — | — | X |

Test specimen No. 49 formed film with difficulty unless a plasticizer was added by 4% or over.
Test specimen No. 52 retained layer construction with difficulty.

It is seen from Table 3 that Resin E proves advantages for use in the multilayered film of this invention when it exhibits crystal melting peak value at a temperature within the range of from 140° to 155° C. as measured by the DSC method and solution viscosity within the range of from 1.05 to 0.85 c.p.

Resin E is a copolymer having vinylidene chloride as a main component and containing as a supplementary component a monomer such as vinyl chloride or vinyl acetate which is copolymerizable with vinylidene chloride. The mixing ratio of the two components can be determined by subjecting the E-layer film to analysis. More often than not, it is a copolymer of vinylidene chloride and vinyl chloride.

When the ethylene-vinyl acetate copolymer (EVA) is included in Resin E, the layer adhesive property between the E layer and other layers is improved and desirable. In this case, to obtain the effect by the addition of EVA, it is desired to use EVA in the amount of 1 to 8 parts by weight, preferably in the amount of 2 to 5 parts by weight, based on 100 parts by weight of the vinylidene chloride copolymer.

Table 4 contains the results of evaluation performed to demonstrate the component layers and their thickness proportions required for the formation of the multilayered film contemplated by the present invention.

TABLE 4

| Test specimen No. | Layer construction | Layer thickness (μ) | Thickness proportion of E layer (%) | Low-temperature shrinkage properties Shrinkage | Shrink tension | Zigzag hazing Test I | Test II | Gas barrier property | Dart impact strength |
|---|---|---|---|---|---|---|---|---|---|
| 53 | D$_3$/E$_2$/D$_3$ | 25/10/25 | 16.7 | ◉ | ◉ | ◉ | △ | ◉ | ◉ |
| 54 | D$_3$/E$_2$/Dx$_1$ | 25/10/25 | " | ◉ | ◉ | ◉ | △ | ◉ | ◉ |
| 55 | D$_3$/E$_2$/Dx$_1$/D$_3$ | 25/10/7/18 | " | ◉ | ◉ | ◉ | △ | ◉ | ◉ |
| 46 | Dx$_1$/E$_2$/Dx$_1$ | 25/10/25 | " | ◉ | ◉ | ◉ | ◉ | ◉ | ◉ |
| 56 | D$_3$/Dx$_1$/E$_2$/Dx$_1$ | 18/7/10/25 | " | ◉ | ◉ | ◉ | ◉ | ◉ | ◉ |
| 57 | D$_3$/Dx$_1$/E$_2$/Dx$_1$/D$_3$ | 18/7/10/7/18 | " | ◉ | ◉ | ◉ | ◉ | ◉ | ◉ |
| 58 | D$_4$/D$_3$/Dx$_1$/E$_2$/Dx$_1$/D$_3$ | 10/10/5/10/7/18 | " | ◉ | ◉ | ◉ | ◉ | ◉ | ◉* |
| 59 | D$_4$/D$_3$/Dx$_1$/E$_2$/Dx$_1$/D$_3$/D$_4$ | 10/10/5/10/5/10/10 | " | ◉ | ◉ | ◉ | ◉ | ◉ | ◉ |
| 60 | Dx$_1$/E$_2$/Dx$_1$ | 17/3/20 | 7.5 | ◉ | ◉ | ◉ | ◉ | △ | ◉ |
| 61 | Dx$_1$/E$_2$/Dx$_1$ | 27/5/28 | 8.3 | ◉ | ◉ | ◉ | ◉ | ○ | ◉ |
| 62 | Dx$_1$/E$_2$/Dx$_1$ | 25/10/25 | 16.7 | ◉ | ◉ | ◉ | ◉ | ◉ | ◉ |
| 63 | Dx$_1$/E$_2$/Dx$_1$ | 27/18/27 | 25.0 | ◉ | ◉ | ◉ | ◉ | ◉ | ◉ |
| 64 | Dx$_1$/E$_2$/Dx$_1$ | 23/25/24 | 34.7 | ○ | ○ | ◉ | ◉ | ◉ | ○ |
| 65 | Dx$_1$/E$_2$/Dx$_1$ | 22/28/22 | 38.9 | △ | △ | ◉ | ◉ | ◉ | △ |
| 66 | Dx$_1$/E$_2$/Dx$_1$ | 8/10/8 | 38.5 | △ | △ | ◉ | ◉ | ◉ | △ |

TABLE 4-continued

| Test specimen No. | Layer construction | Layer thickness (μ) | Thickness proportion of E layer (%) | Low-temperature shrinkage properties | | Zigzag hazing | | Gas barrier property | Dart impact strength |
|---|---|---|---|---|---|---|---|---|---|
| | | | | Shrinkage | Shrink tension | Test I | Test II | | |
| 67 | $Dx_1/E_2/Dx_1$ | 14/18/15 | 38.3 | Δ | Δ | ◎ | ◎ | ◎ | Δ |
| 68 | $D_3/Dx_1/E_2/Dx_1/D_3$ | 9/5/18/5/10 | 38.3 | Δ | Δ | ◎ | ◎ | ◎ | Δ |

*Evaluation made from $D_3$ side

According to the data of Table 4, the layer constructions necessary for accomplishing the first through third objects of this invention are at least D/E/D, D/E/Dx, D/E/Dx/D, for example. More effective layer constructions are Dx/E/Dx, D/Dx/E/Dx, D/Dx/E/Dx/D and D/D/Dx/E/Dx/D, wherein all the E layers used are adjoined on both surfaces by Dx layers instead of D layers.

When two D layers are incorporated in a joined state as in the layer construction of D/D/Dx/E/Dx/D, for example, the D layer which forms the outermost surface layer is required to have a resin composition capable of providing properties such as oil resistance, heat resistance and toughness which are naturally expected of any surface layer while the other D layer may be formed of a resin composition providing other properties. Thus, use of two or three D layers serves specially advantageous purposes.

Although the plurality of D layers differ from one another in resin composition, they invariably belong to the category of Resin D and, therefore, are collectively referred to as D layers. According to this rule, all the aforementioned layer constructions can be collectively referred to as D/E/D layer constructions.

Concerning the thickness composition, in the multilayered film having a total thickness (of the component layers) of 30 to 100 μ, a practical thickness range for any heat shrinkage multilayered film, the D layer is required to have a thickness of not less than 5 μ in order to provide a satisfy gas barrier property. When its thickness is greater than 25 μ, however, the multilayered film possesses an excessive quality. It is, therefore, clear that the thickness of the E layer should fall in the range of from 5 to 25 μ so that the proportion of the thickness of the E layer falls within the range of from 5 to 35% based on the total thickness of all the layers used. When its proportion exceeds 35%, there ensues a disadvantage that the multilayered film fails to offer satisfactory shrinkage properties.

The first version of the present invention has been described. While the multilayered film conforming to the first version of this invention permits accomplishment of the first through third objects of this invention, it cannot fully meet the fourth and fifth objects of this invention. A possible reason may be that the D layer is formed of a mixed resin formulated to satisfy a special set of necessary properties and, therefore, it is not always capable of satisfying other various properties.

The second version of this invention is aimed at fulfilling the fourth and fifth objects of this invention. The second version simply consists in adding a surface layer to at least one of the opposite surface layers of the multilayered film contemplated by the second version of this invention.

Fortunately, Resin D exhibits outstanding adherency to olefinic resins. The surface layer for addition to the multilayered film of the first version, therefore, can be formed of a polymer or mixed polymer selected from the components of Resin A and Resin C by taking advantage of the high adherency of Resin D.

A resin selected for use in the surface layer turns out to be an ideal choice when the selected resin exhibits surface properties most needed by a particular use for which the film is intended.

Table 5 contains data which indicates the significance of the role played by the surface layer and that of the thickness composition of the components used in the surface layer, involved in the second version of this invention.

TABLE 5

| Test specimen No. | Layer construction (Seal side) ← | Thickness (μ) | A, C layer thickness ratio (%) | Low-temperature shrinkage properties | | Seal strength properties | | | Specular gloss* | Haze* |
|---|---|---|---|---|---|---|---|---|---|---|
| | | | | Shrinkage | Shrink tension | Resistance to heat | Resistance to oil | Drop-bag seal strength | | |
| 70 | $Dx_1/E_2/Dx_1$ | 16/8/16 | — | ◎ | ◎ | O | Δ | O | O | O |
| 71 | $A_4/Dx_1/E_2/Dx_1$ | 1/15/8/16 | 2.5 | ◎ | ◎ | O | Δ | O | O | O |
| 72 | $A_4/Dx_1/E_2/Dx_1$ | 2/14/8/16 | 5 | ◎ | ◎ | O | O | O | ◎ | O |
| 69 | $A_4/Dx_1/E_2/Dx_1$ | 15/10/10/25 | 25 | ◎ | ◎ | ◎ | ◎ | ◎ | ◎ | ◎ |
| 73 | $A_4/Dx_1/E_2/Dx_1$ | 25/7.5/10/20 | 40 | O | O | ◎ | ◎ | ◎ | ◎ | ◎ |
| 74 | $A_4/Dx_1/E_2/Dx_1$ | 27/6/10/20 | 42.9 | Δ | Δ | ◎ | ◎ | ◎ | ◎ | ◎ |
| 75 | $A_4/Dx_1/E_2/Dx_1/A_4$ | 10/15/10/15/10 | 33.3 | ◎ | ◎ | ◎ | O | ◎ | ◎ | ◎ |
| 76 | $A_4/Dx_1/E_2/Dx_1/A_7$ | 10/15/10/15/10 | 33.3 | ◎ | ◎ | ◎ | O | ◎ | ◎ | ◎ |
| 77 | $C_1/Dx_1/E_2/Dx_1/C_1$ | 5/20/10/20/5 | 16.7 | ◎ | ◎ | ◎ | ◎ | ◎ | ◎ | ◎ |
| 78 | $A_4/D_1/Dx_1/E_2/Dx_1/D_1/A_4$ | 10/15/5/10/5/10/5 | 25 | ◎ | ◎ | ◎ | O | ◎ | ◎ | ◎ |
| 79 | $A_7/Dx_1/E_2/Dx_1/A_7$ | 5/20/10/15/10 | 33.3 | ◎ | ◎ | O | Δ | O | ◎ | ◎ |

*Evaluation made from seal side

It is seen from the data of Table 5 that when an ethylenic ionomer resin is adopted for the surface layer in a use requiring the film to exhibit transparency and specular gloss or the resin having mainly polypropylene type resin in a use requiring the film to offer seal resistance to heat and oil, for example, the produced multilayered film conforms to the second version of this invention because the properties needed by the specific use are fully exhibited to a high level compared with the film of the first version destitute of the surface layer.

For the surface layer to discharge its role satisfactorily, it is required to have a thickness of at least 2 $\mu$. When the thickness exceeds 25 $\mu$, however, there ensues a disadvantage that the film is impaired in its low-temperature shrinkage properties. It is further seen that the surface layer functions most effectively in the multilayered film when the proportion of its thickness to the total thickness, 30 to 100 $\mu$, of all the layers of the multilayered film falls within the range of from 5 to 40%.

Table 6 contains the results of the overall evaluation performed on typical multilayered films conforming to the first and second versions of this invention with respect to all the film properties the present invention contemplates embracing. For the purpose of comparison, typical multilayered films not meeting the layer constructions of this invention and typical commercially available films intended for the same purpose were used for the evaluation.

Figure 5:
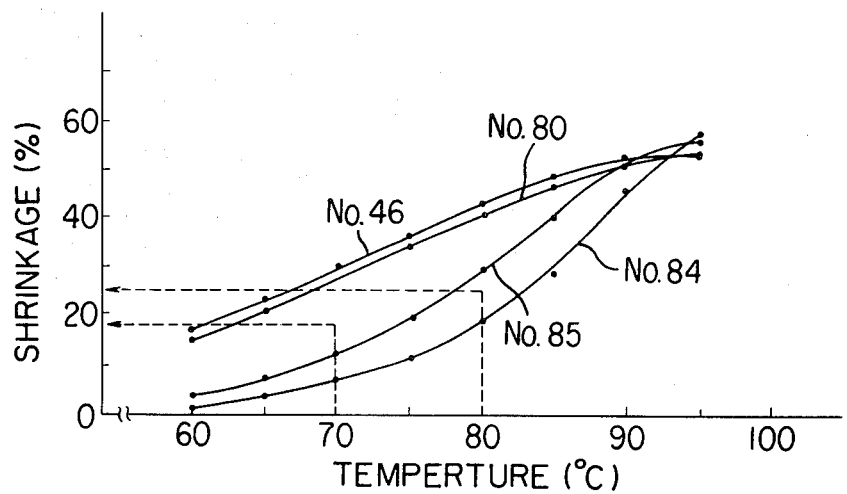
FIGS. 5 and 6 are graphs comparing the multilayered film of this invention and a commercially available film in terms of low-temperature shrinkage properties.

The data of Table 6 serve to indicate that the properties evaluated in Tables 1 through 5 are those simply representing the properties which the multilayered films of this invention are able to fulfil.

properties; FIG. 5 containing data on shrinkage and FIG. 6 those on shrink tension.

Figure 6:
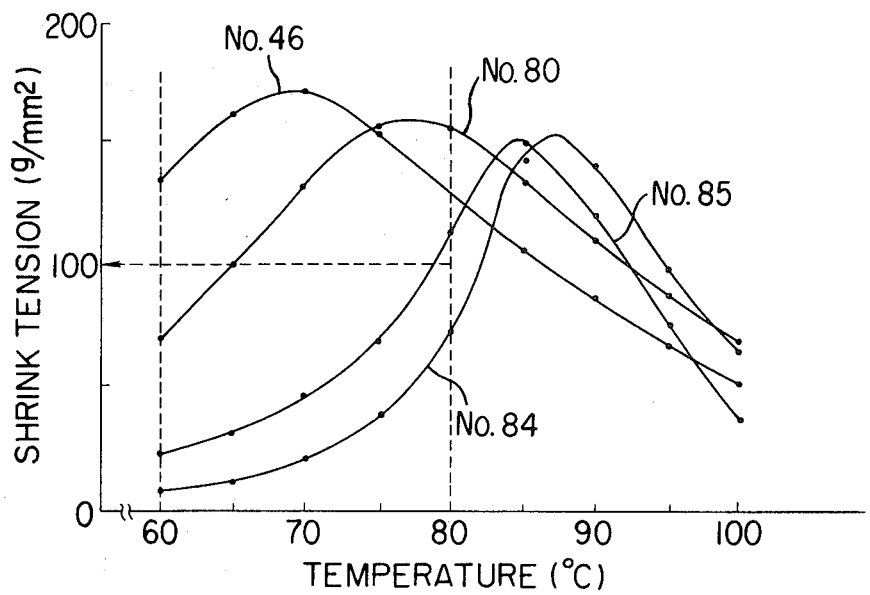

A review of the data of FIGS. 5 and 6 reveals that the multilayered films of this invention are characterized by excelling commercially available films in terms of low-temperature shrinkage properties.

Table 7 compares multilayered films conforming to the present invention with commercially available films in terms of dart impact strength.

TABLE 7

| Test specimen No. | Classification of film | Thickness ($\mu$) | Dart impact strength (kg · cm at 5° C.) |
|---|---|---|---|
| 46 | Film of this invention | 60 | 223 |
| 80 | Film of this invention | 60 | 196 |
| 84 | Commercially available film A | 60 | 127 |
| 85 | Commercially available film B | 60 | 138 |

It is seen from Table 7 that the multilayered films conforming to the present invention exhibit higher dart impact strength than the commercially available films.

TABLE 6

| Test specimen No. | Layer construction → (Seal side) | Thickness ($\mu$) | Low-temperature shrinkage properties | | Gas barrier property | Zigzag hazing | | Dart impact strength |
|---|---|---|---|---|---|---|---|---|
| | | | Shrinkage | Shrink tension | | Test I | Test II | |
| 80 | $D_3/Dx_1/E_2/Dx_1/D_3$ | 15/5/10/5/25 | ◎ | ◎ | ◎ | ◎ | ◎ | ◎ |
| 81 | $A_4/Dx_1/E_2/Dx_1/A_4$ | 6/10/10/19/15 | ◎ | ◎ | ◎ | ◎ | ◎ | ◎ |
| 82 | $Dx_1/D_3/E_2/D_3/Dx_1$ | 15/5/10/5/25 | ◎ | ◎ | ◎ | ◎ | Δ | ◎ |
| 83 | $C_3/Dx_1/E_2/Dx_1/C_3$ | 10/10/10/10/20 | Δ | Δ | ◎ | ◎ | ◎ | ◎ |
| 84 | EVA/VDC/EVA Crosslinked | 15/10/35 | Δ | Δ | O | Δ | X | Δ |
| 85 | EVA/EVA/VDC/EVA/IR | 13/3/9/3/32 | Δ | O | O | X | X | Δ |
| 86 | EVA/EVA/VDC/EVA/EVA | 15/5/10/5/45 | X | X | ◎ | X | X | Δ |

| Test specimen No. | Layer construction → (Seal side) | Thickness ($\mu$) | Seal strength properties | | | Specular gloss* | Clipping property |
|---|---|---|---|---|---|---|---|
| | | | Resistance to heat | Resistance to oil | Drop-bag seal strength | | |
| 80 | $D_3/Dx_1/E_2/Dx_1/D_3$ | 15/5/10/5/25 | ◎ | O | ◎ | O | ◎ |
| 81 | $A_4/Dx_1/E_2/Dx_1/A_4$ | 6/10/10/19/15 | ◎ | ◎ | ◎ | ◎ | ◎ |
| 82 | $Dx_1/D_3/E_2/D_3/Dx_1$ | 15/5/10/5/25 | O | Δ | ·O | O | ◎ |
| 83 | $C_3/Dx_1/E_2/Dx_1/C_3$ | 10/10/10/10/20 | ◎ | ◎ | Δ | ◎ | Δ |
| 84 | EVA/VDC/EVA Crosslinked | 15/10/35 | O | X | X | ◎ | X |
| 85 | EVA/EVA/VDC/EVA/IR | 13/3/9/3/32 | X | O | Δ | O | X |
| 86 | EVA/EVA/VDC/EVA/EVA | 15/5/10/5/45 | X | X | X | O | Δ |

EVA: Ethylene-vinyl acetate copolymer
VDC: Vinylidene chloride type resin
IR: Ionomer resin
*Evaluation made from seal side It is seen from the data of Table 6 that the multilayered film of the present invention excels the commercially available film, for example, in terms of low-temperature shrinkage properties and it exhibits many properties at high levels.

FIGS. 5 and 6 compare the multilayered films conforming to the present invention with commercially available films in terms of low-temperature shrinkage This notably high dart impact strength has never been attained by any of conventional multilayered films using vinylidene chloride type resin and forms one of the characteristics of the films of this invention.

Table 8 compares multilayered films conforming to the present invention with commercially available films in terms of adaptability to practical use.

TABLE 8

| Item of evaluation | Test Specimen | | | | Remark |
|---|---|---|---|---|---|
| | Film of this invention (No. 80) | Film of this invention (No. 81) | Commercially available film A | Commercially available film B | |
| Appearance | | | | | |
| (1) | Good | Good | Bad | Fairly poor | 80° C. × 4 sec. |
| (1) | Good | Good | Poor | Poor | 90° C. × 4 sec. |
| (2) | Good | Good | Poor(fair hazing) | Poor(hazing) | 90° C. × 4 sec. |
| (3) | Negligible | Negligible | Poor | Poor | 80° C. × 4 sec. |

TABLE 8-continued

| Item of evaluation | Test Specimen | | | | Remark |
|---|---|---|---|---|---|
| | Film of this invention (No. 80) | Film of this invention (No. 81) | Commercially available film A | Commercially available film B | |
| Airtightness of seal | None in 2 weeks None in 2 weeks | None in 2 weeks None in 2 weeks | 3 bags in 2 days 1 bag in 1 week | 1 bag in 2 days None in 2 weeks | 80° C. × 4 sec. 90° C. × 4 sec. |
| Drop-bag seal strength | Neither pinhole nor rupture produced (in 10 drops) | Neither pinhole nor rupture produced (in 10 drops) | Pinholes produced (in 3 drops) | Rupture produced (in 5 drops) | 90° C. × 4 sec. |

From the data of Table 8, it is seen that the films of the present invention produce packages which shrink satisfactorily at low temperatures and come into intimate contact with their contents and give good appearance, sustain ruptures seldom when handled and transported at low temperatures and impart good preservability to their contents. Thus, they far excels the conventional commercially available films in adaptability to practical use. This fact indicates that the films of this invention enjoy excellent adaptability to practical use enough to meet the needs of the market and, at the same time, serves to demonstrate the usefulness of the present invention.

Table 9 contains the results of evaluation of the multilayered films in terms of gas barrier property.

According to Table 9, the films conforming to the present invention exhibit high gas barrier property at the time of producing film and gas barrier property is degraded very little by ageing (10% at most). This characteristic ensures long preservation of the contents of these films. Further, the fact that the plasticizer is contained in a very small amount in the multilayered film and this plasticizer has little freedom of bleeding from film forms another merit for the films of this invention from the standpoint of food hygiene.

The experiments conducted by the inventors have established that the aforementioned layer constructions and thickness compositions contemplated by this invention warrant manifestation of the following properties in particular. The numerical values enclosed with parentheses represent outstanding results obtained in the actual market evaluation.

Heat shrinkage at 70° C.: 18 to 30% (23 to 30%)
Heat shrinkage at 80° C.: 25 to 45% (30 to 45%)
Peak shrink tension at temperatures of 60° to 80° C.: 100 to 200 g/mm$^2$ (125 to 200 g/mm$^2$)
Dart impact strength at 5° C. and 60μ: 150 to 250 kg. cm (180 to 250 kg.cm)
Gas barrier property: 20 to 4 cc/25 μ/m$^2$0.24 hr. atm. 23° C. (12–4 cc/25 μ/m$^2$0.24 hr. atm. 23° C.) (calculated for barrier layer thickness)
Haze [ASTM D1003-61(1970)]: 15 to 3% (10 to 3%)
Gloss [ASTM D527-67]: 55 to 80 (65 to 80)

The multilayered film of this invention is produced by extruding a tubular multilayered parison of the layer construction of this invention by the conventional circular coextrusion method using two to five extruders, for example. The thickness of each component layer in the multilayered film can be set and adjusted by regulating the amount of the relevant resin being extruded during the coextrusion.

As soon as the tubular parison emerges from the extruder, it is cooled so that the surface temperature of the parison falls to 20° C. Then, this parison is guided toward the drawing unit and, en route to the drawing unit, it is heated so that the surface temperature rises to a sufficient low temperature within the range of from 40° to 65° C. The heated parison is subjected to biaxial inflation drawing at an elongation of 200 to 450 percent in each direction to produce a tubular inflated film. The tubular film is folded flat and then wound in its tubular form on a bobbin. Otherwise, the tubular film is cut open along one of its folded edges and then wound in its strip form on a bobbin.

This method of manufacture is characterized by the extent to which the tubular parison is overcooled and by the temperature regulation before and after the drawing. It is believed that owing to these characteristics of the manufacturing method coupled with the characteristics of the resin combination, the multilayered films conforming to the present invention are enabled to manifest the low-temperature heat shrinkage properties heretofore never attained by the conventional films in conjunction with other outstanding properties.

This particular drawing method of this invention requires advanced skills in film drawing and temperature regulation. Persons assigned to the manufacture of the multilayered film of this invention are, therefore, required to carry out trial manufacture of such film on the actual drawing unit so as to be fully acquainted with the relation between the length of film from the point the drawing is started to the point the film is folded and the folded width of the film, and then design conditions necessary for minimizing possible thickness fluctuation of the parison.

The composition of Resin A which is one of the components for the resin of the D layer of this invention is a polymer which has hardness intermediate between rigidity and flexibility and a fairly low degree of crystallinity. It is therefore a copolymer of ethylene and a monomer selected from the group consisting of vinyl esters, unsaturated aliphatic monocarboxylic acids and alkyl ester derivatives of unsaturated aliphatic monocarboxylic acids or a metal-crosslinked copolymer of ethylene and said selected monomer or a mixture of such copolymers. Concrete examples of the copolymer include ethylene-vinyl acetate copolymer (EVA), ethylene-ethyl acrylate copolymer (EEA), ethylene-methyl methacrylate copolymer (EMMA), ethylene-acrylic acid copolymer (EAA), ethylene-methacrylic acid copolymer (EMA) and copolymers (ionomer resin) obtained by at least partial ionomerization of polymers possessing carboxyl group, which carboxyl group is prepared by at least partial saponification of the copolymers mentioned above. In these copolymers, the monomers other than ethylene are desired to account for a proportion falling within the range of from 2 to 12 mol%, preferably from 3 to 10 mol%. When their amounts exceed 2 mol%, the resins exhibit seal properties, flexibility, transparency and various strength properties at enhanced levels. When their amounts exceed 12 mol%, however, the resins become deficient in extrudability and miscibility with other components. The resin is desired to have melt index within the range of from 0.2 to 10 g/10 minutes, preferably from 0.3 to 5 g/10 minutes. When the melt index is less than 0.2 g/10 minutes, the material of the resin poses a problem on mixability and extrudability. When it exceeds 10 g/10 minutes, the resin as a basal material possibly shows insufficient strength so that the bubble of film being drawn may tend to sustain rupture. Of the various copolymers enumerated above, EVA proves to be most desirable to be used as one of the component layers in the multilayered film. It is desired to have a vinyl acetate content within the range of from 3 to 8 mol%, preferably from 3 to 7 mol%.

Now Resin B, namely a thermoplastic elastomer comprising ethylene and an α-olefin copolymer, is a non-rigid copolymer to be formed of ethylene and one or more α-olefins selected from the group of α-olefins of 3 to 12 carbon atoms. Optionally, this copolymer may be further copolymerized with a small amount of a hydrocarbon of polyene structure such as, for example, dicyclopentadiene, 1,4-hexadiene, or ethylidene norbornene. Concrete examples of the α-olefin include propylene, butene-1, hexene-1, heptene-1, 4-methyl-1-pentene and octene-1. Of these α-olefins, propylene and butene-1 are particularly desirable. The ethylene content of the copolymer is desired to fall within the range of from 40 to 93 mol%, preferably from 75 to 95 mol%.

The copolymer is desired to possess density of not more than 0.91 g/cm$^3$ and Vicat softening point (as measured under the load of 1 kg by the method of ASTM D-1525) of not more than 70° C. The copolymer of ethylene and an α-olefin to be used in the present invention can be qualitatively analyzed by the infrared spectrometry. A particularly desirable copolymer is formed of ethylene and propylene or butene-1. The copolymer of ethylene and propylene is the best choice. This copolymer may optionally incorporate as a comonomer a small amount of a compound possessed of diene structure. The copolymer is desired to possess melt index within the range of from 0.1 to 10 g/10 minutes, preferably from 0.2 to 6 g/10 minutes. The thermoplastic elastomer is not in the nature of giving rise to cold flow. This resin possesses ample thermoplasticity so that it may be extruded all by itself in the form of a film.

Resin C is a polymer having fairly high rigidity and a fairly high degree of crystallinity. Specifically, it is formed of crystalline polypropylene or crystalline polybutene-1 of a high molecular weight, which is desired to possess Vicat softening point of not less than 100° C. The crystalline polypropylene which is one of the compounds usable as Resin C a crystalline polypropylene of high isotacticity ordinarily available in the market. It is desired to be a homopolymer of propylene or a copolymer of propylene and not more than 7 mol% of ethylene, butene-1 or some other α-olefin. Optionally, the polymers mentioned above may be mixed as desired.

This resin is desired to have melt flow index within the range of from 0.5 to 20 g/10 minutes, preferably from 0.7 to 15 g/10 minutes.

The polybutene-1 is a crystalline polymer of a high molecular weight having a butene-1 content of not less than 93 mol%. It may incorporate other comonomer. Unlike the liquid or waxy polybutene-1 having a low molecular weight, this polymer is desired to possess melt index within the range of from 0.2 to 10 g/10 minutes. Of the comonomers usable for incorporation into this polybutene-1, it is desirable mainly to use crystalline polypropylene. A mixture of crystalline polypropylene and crystalline polybutene-1 is also usable. Besides the polymers described above, any rigid polymer or additives which meets the purpose of this invention can be used instead.

The melt index (MI) and the melt flow index (MFI) referred to above are to be determined under the conditions E and L respectively specified by ASTM D 1238-73.

The solution viscosity as used in connection with this invention is the relative viscosity which is determined by the following procedure.

(1) The amount of a given vinylidene chloride type copolymer which is calculated in accordance with the following formula is to be weighed out accurately.

$$\text{Amount to be taken} = 0.5326(g) \times \frac{100}{100 - \text{plasticizer content (\%)}}$$

(2) In a constant temperature bath kept at 150° C.±1° C., the above sample is thoroughly dissolved by addition of 20 ml of o-dichlorobenzene.

(3) A 10-ml portion of the solution obtained in (2) above is transferred with a whole pipette into a Cannon-Fenske viscosimeter, then placed in a measuring column kept at 120° C.±0.05° C. and allowed to stand therein for five minutes.

(4) The time which elapses until the mark is passed is clocked and noted with the aid of a stop watch.

(5) The tube factor is separately determined by the JIS method after lapse of a fixed length of time (on the order of seconds). The solution viscosity (relative viscosity) is calculated by the multiplication using this tube factor.

The crystal melting peak temperature as used in connection with this invention is the temperature which is determined by use of a differential scanning calorimeter (such as the instrument manufactured by Parken Elmer Corp., and marketed under product designation of MODEL DSC-1E), with the temperature increasing rate fixed at 10° C./min.

The methods of evaluation and the scales of evaluation used in this invention will be described below.

1. Shrinkage:

A test piece of film cut to a size of 10 cm×10 cm is kept in a free state for four seconds in hot water adjusted to a stated temperature. The shrunken test piece is measured for its length in both directions. The linear shrinkage, namely the proportion of the new lengths to the original lengths, is calculated and noted. This measurement is performed on 10 test pieces for each test temperature. The average of the ten pairs of proportions is recorded. Shrinkage is expressed by the average of the longitudinal and transverse shrinkage.

Scale of evaluation:

The shrinkage determined for each test temperature as described above is evaluated on the following scale.

| 70° C. | 80° C. |
|---|---|
| ⊚: 23% or over | ⊚: 30% or over |
| ○: 18% or over and less than 23% | ○: 25% or over and less than 30% |
| △: 10% or over and less than 18% | △: 15% or over and less than 25% |

-continued

| 70° C. | 80° C. |
|---|---|
| X: Less than 10% | X: Less than 15% |

Then, the combined evaluation is made on the following scale.

| | |
|---|---|
| Where the marks for the two temperatures are both ⊚: | ⊚ |
| Where one of the marks is ○ and the other is ○ or ⊚: | ○ |
| Where either of the marks is Δ: | Δ |
| Where either of the marks is X: | X |

2. Shrink tension (according to the method of ASTM D-2838-69):

Test specimens each 1 cm in width and 8 cm in length are cut off in the directions of length and width of a given film. In silicone oil adjusted to a stated test temperature, the test specimens are kept for five seconds. After lapse of five seconds, the test specimens are measured for shrink tension (with a chuck distance of 50 mm). The average of the ten pairs of shrink tension values obtained of ten test pieces is recorded. Shrink tension is expressed by average of the longitudinal and transverse shrink tension.

Scale of evaluation:
⊚ : The maximum shown between 60° C. and 80° C. is 125 g/mm$^2$ or over
○ : The maximum is 100 or over and less than 125
Δ: The maximum is 50 or over and less than 100
X: The maximum is less than 50

3. Seal strength properties:

Two sheets of a given film are held one on top of the other and are sealed at 260° C. for 0.8 second. The sealed film thus prepared is used in the following tests.

(1) Resistance to oil

From the sealed film, test specimens 10 cm in length and 1 cm in width are cut out so that the sealed portion falls at the center of the length of each test specimen. They are immersed in lard at 35° C. and quickly removed, subjected to a load of 20 g, then immersed in hot water at 95° C. and allowed to stand therein until the sealed portions are separated or broken. The intervals of standing in the hot water until the separation or breakage are clocked and recorded (on the order of seconds). The average of the ten sets of values is calculated and recorded.

Scale of evaluation:
⊚ : 60 seconds or over
○ : 30 seconds or over and less than 60 seconds
Δ: 10 seconds or over and less than 30 seconds
X: Less than 10 seconds (2) Resistance to heat:

From the sealed film, test specimens 10 cm in length and 1 cm in width are cut out so that the sealed portion falls at the center of the length of each test specimen. The test specimens, with a load of 40 g applied thereto, immersed in hot water at 95° C. and allowed to stand therein until the sealed portions are separated or broken. The intervals of standing in the hot water until the separation or breakage are clocked and recorded (on the order of seconds). The average of the ten sets of values is calculated and recorded.

Scale of evaluation:
⊚: 40 seconds or over
○ : 20 seconds or over and less than 40 seconds
Δ: 10 seconds or over and less than 20 seconds
X: Less than 10 seconds (3) Drop-bag seal strength:

Bags of a given film 600 mm in length and 400 mm in folded width are filled with 4 kg of cold water at 10° C. and 1 kg of finely crushed ice, with the openings tied so that no air is allowed to remain in the bags. The bags are kept under hot water at 90° C. for four seconds, to be shrunken therein. They are placed in a container filled with water and ice and are left standing overnight in a room kept at 1° C. The bags are then checked to confirm that the water temperature therein has fallen to 2° C. In a room kept at 2° C., the bags are dropped to the floor from a height of 1 m so that the sealed surfaces collide perpendicularly with the floor surface. This dropping of bags is continued until bags break or sustain pinholes. Count is taken of the drops of each bag. The average of the ten counts obtained of ten bags is recorded.

Scale of evaluation:
⊚ : 9 or over
○ : 6 to 8
Δ: 3 to 5
X: 2 or less

4. Dart impact strength (according to the method of ASTM D-1709-75):

In a room kept at 5° C., a missile 38 mm in diameter is dropped from a height of 2 m onto a given film kept in advance at 5° C. for 24 hours, with the load increased or decreased by an increment of 80 g. After the missile has been dropped a total of 20 times, the impact strength is determined by the ASTM method mentioned above. The numerical value thus obtained is proportionated for a fixed film thickness of 60μ.

Scale of evaluation:
⊚ : 180 kg.cm or over
○ : 150 or over and less than 180
Δ: 120 or over and less than 150
X: Less than 120

5. Adaptability for coextrusion into film:

A given film is evaluated with respect to low-temperature extrusion, cold drawn property, film color, uneven resin flow and resistance to layer delamination. The overall evaluation is based on the four marks given to the film, as follows:

| | |
|---|---|
| The combination in which at least three marks are ⊚ and the remaining one, if any, is ○ : | ⊚ |
| The combination in which at least two marks are ○ and the other one or two are ⊚: | ○ |
| The combination in which any one of the marks is Δ: | Δ |
| The combination in which any one of the marks is X: | X |

(1) Low-temperature extrusion, cold drawn property:

When a given multilayered film is produced by the method of extrusion and cold drawn orientation described earlier in this specification, the evaluation of this property is made by noting whether or not the average resin temperature at the die lip outlet is 190° C. and the parison on the verge of cold drawn orientation falls within the range of from 40° to 45° C.

Scale of evaluation:
⊚ : Cold drawn orientation obtained easily.
○ : Cold drawn orientation obtained fairly.
Δ: Cold drawn orientation obtained with slight difficulty.
X: No cold drawn orientation obtained (2) Color of film:

The film obtained through the steps described in (1) above is tested for haze and the color of film is evaluated based on the haze. (The method is similar to that used for testing haze.)

Scale of evaluation:
- ⊚ : Less than 10%
- ○ : 10% or over and less than 20%
- △: 20% or over and less than 25%
- ×: 25% or over (3) Uneven resin flow:

From the film obtained in (1) above, test specimens 50 cm × 50 cm are cut out, held in the path of light from a fluorescent lamp to the observer's eye and subjected to sensory test to note the condition of resin flow.

Scale of evaluation:
- ⊚ : Total absence of uneven resin flow
- ○ : Substantial absence of uneven resin flow
- △: Fair presence of uneven resin flow
- ×: Heavy presence of uneven resin flow (4) Resistance to layer delamination:

In a given film, the strength with which the vinylidene chloride type resin layer and the adjoining layers are delaminated by peeling at an angle of 180° C. This test is performed at a peeling rate of 200 mm/min. in a room kept at 20° C.

Scale of evaluation:
- ⊚ : 50 g/cm of width or over
- ○ : 25 or over and less than 50
- △: 10 or over and less than 25
- ×: Less than 10

6. Zigzag hazing:

(1) Test I (under conditions of gradual shrinkage):

From a given film, test specimens 10 cm × 10 cm are cut out. They are immersed in a free state in hot water at 90° C. for five seconds, taken out of the hot water and immediately cooled with tap water. The shrunken test pieces are cut in the direction of thickness, and the cross sections are inspected.

Scale of evaluation:
- ⊚ : Absolutely no occurrence of zigzag deformation
- ○ : Slight occurrence of zigzag deformation
- △: Occurrence of zigzag deformation in a fairly large portion
- ×: Occurrence of zigzag deformation throughout the entire cross section (2) Test II (under conditions of sudden shrinkage):

The procedure of Test I is duplicated, except that the treating temperature and time are changed to 95° C. and 60 seconds respectively.

Scale of evaluation:
- ⊚ : Absolutely no occurrence of zigzag deformation
- ○ : Slight occurrence of zigzag deformation
- △: Occurrence of zigzag deformation in a fairly large portion
- ×: Occurrence of zigzag deformation throughout the entire cross section 7. Gas barrier property (according to the method of ASTM D-1434-75):

With a tester (produced by MOCON Corp., and marketed under product designation of Model OX-TRAN-100), a given film is tested for gas barrier property at 23° C. The value obtained is calculated for a fixed barrier layer thickness of 25μ.

- ⊚ : 12 cc/25 μ/m².24 hr.atm at 23° C. or less
- ○ : More than 12 and 20 or less
- △: More than 20 and 32 or less
- ×: More than 32

8. Fluctuation in thickness and width:

A given film 500 m in length is measured for thickness and width at the points successively separated by fixed intervals of 5 m from a given point of origin to note whether or not the values found involve any dispersion.

| Scale of evaluation: | |
|---|---|
| (Fluctuation in thickness) | (Fluctuation in width) |
| ⊚: Less than ± 1% | ⊚: Less than ± 1% |
| ○: ± 1% or over and less than ± 3% | ○: ± 1% or over and less than ± 3% |
| △: ± 3% or over and less than ± 5% | △: ±3% or over and less than ± 5% |
| ×: ± 5% or over | ×: ± 5% or over |

The overall evaluation is made based on the combination of the two marks given to the test specimen, as follows:

| | |
|---|---|
| The combination in which the two marks are both ⊚: | ⊚ |
| The combination in which one mark is ○ and the other mark is ⊚ or ○: | ○ |
| The combination in which either of the two marks is △: | △ |
| The combination in which either of the two marks is ×: | × |

9. Gloss:

A given film is tested for gloss in accordance with the method of ASTM D527-67, with the angle fixed at 20°.

Scale of evaluation:
- ⊚ : 65% or over
- ○ : 55% or over and less than 65%
- △: 45% or over and less than 55%
- ×: Less than 45%

10. Haze:

A given film is tested for haze in accordance with the method of ASTM D1003-61 (1970).

Scale of evaluation:
- ⊚ : Less than 10%
- ○ : 10% or over and less than 15%
- △: 15% or over and less than 20%
- ×: 20% or over 11. Clipping property:

A given folded tubular film 60μ in thickness and 400 mm in folded width is clipped with a vacuum clipper (produced by Reem Corp., and marketed under trademark designation of Bag G) and immersed in hot water at 90° C. for four seconds. Air is injected to the clipped portion of the tubular film at a pressure increasing rate of 1 kg/cm²/10 seconds to note the pressure at which air leaks through the clipped portion. The average of ten values obtained of 10 test specimens is recorded.

Scale of evaluation:
- ⊚ : 1.5 kg/cm² or over
- ○ : 1.0 or over and less than 1.5
- △: 0.5 or over and less than 1.0
- ×: Less than 0.5

Now, the present invention will be specifically described with reference to working examples. The resins used in the working examples are shown in Tables A, B and C.

TABLE A

| Symbol | Description | Ethylene content (mol %) | Melt index (g/10 min.) | Vicat softening point (VSP: °C.) | Density (g/cm³) |
|---|---|---|---|---|---|
| $A_1$ | Ethylene-vinyl acetate copolymer (EVA) | 94.5 | 1.0 | 72 | — |
| $A_2$ | Ethylene-methyl methacrylate copolymer (EMMA) | 90 | 1.8 | — | — |
| $A_3$ | Ethylene-acrylic acid copolymer (EAA) | 92 | 2.0 | — | 0.93 |
| $A_4$ | Partially saponified ethylene-methyl methacrylate copolymer (60% saponification) in the presence of $Na^+$ ion (degree of neutralization 30%) | 94.3 | 1.0 | 67 | — |
| $A_5$ | A 60:10 (wt %) mixture of $A_1$ and $A_4$ | — | — | — | — |
| $A_6$ | A 30:10 (wt %) mixture of $A_1$ and $A_4$ | — | — | — | — |
| $A_7$ | Ethylene-vinyl acetate copolymer (EVA) | 96.5 | 0.8 | 78 | — |
| $B_1$ | Ethylene-propylene-ethylidene norbornene random copolymer thermoplastic elastomer (ethylidene, norbornene 2 wt %) | 83 | 0.45 | 40 max. | 0.88 |
| $B_2$ | Ethylene-butene-1 random copolymer elastomer | 85 | 0.6 | 40 max. | 0.88 |
| $C_1$ | Crystalline polypropylene (PP) | 4 | MFR 7.0 | 143 | 0.88 |
| $C_2$ | Crystalline polybutene-1 (PB-1) | 4 | MI 1.0 | 110 | 0.91 |

TABLE B

| Symbol | Resin D A | Resin D B | Resin D C | Proportion (wt %) A | Proportion (wt %) B | Proportion (wt %) C |
|---|---|---|---|---|---|---|
| $D_1$ | $A_1$ | $B_1$ | $C_1$ | 90 | 5 | 5 |
| $D_2$ | $A_1$ | $B_1$ | $C_1$ | 80 | 10 | 10 |
| $D_3$ | $A_1$ | $B_1$ | $C_1$ | 40 | 35 | 25 |
| $D_4$ | $A_1$ | $B_1$ | $C_1$ | 40 | 20 | 40 |
| $Dx_1$ | $A_1$ | $B_1$ | $C_1$ | 70 | 15 | 15 |

TABLE C

| Symbol | Description | DSC peak temperature (°C.) | Solution viscosity (c.p.) |
|---|---|---|---|
| VDC-1 | Vinylidene chloride-vinyl chloride copolymer 100 parts Epoxidized soybean oil 1 part Acetyl tributyl citrate 1 part | 158 | 0.92 |
| VDC-2 | Vinylidene chloride-vinyl chloride copolymer 100 parts Epoxidized soybean oil 1 part Acetyl tributyl citrate 1 part | 137 | 0.92 |
| VDC-3 | Vinylidene chloride-vinyl chloride copolymer 100 parts Epoxidized soybean oil 1 part Acetyl tributyl citrate 1 part | 146 | 1.08 |
| VDC-4 | Vinylidene chloride-vinyl chloride copolymer 100 parts Epoxidized soybean oil 1 part Acetyl tributyl citrate 1 part | 146 | 0.82 |
| $E_1$ | Vinylidene chloride-vinyl chloride copolymer 100 parts Epoxidized soybean oil 1 part Acetyl tributyl citrate 1 part | 155 | 0.92 |
| $E_2$ | Vinylidene chloride-vinyl chloride copolymer 100 parts Epoxidized soybean oil 1 part Acetyl tributyl citrate 1 part | 146 | 0.92 |
| $E_3$ | Vinylidene chloride-vinyl chloride copolymer 100 parts Epoxidized soybean oil 1 part Acetyl tributyl citrate 1 part | 140 | 0.92 |
| $E_4$ | Vinylidene chloride-vinyl chloride copolymer 100 parts Epoxidized soybean oil 1 part Acetyl tributyl citrate 1 part | 146 | 1.05 |
| $E_5$ | Vinylidene chloride-vinyl chloride copolymer 100 parts Epoxidized soybean oil 1 part Acetyl tributyl citrate 1 part | 146 | 0.85 |
| $E_6$ | Vinylidene chloride-vinyl chloride copolymer 100 parts Epoxidized soybean oil 1 part EVA (VAc 40%, M.I. 75 g/10 min.) 2 parts | 148 | 0.90 |
| $E_7$ | Vinylidene chloride-vinyl chloride copolymer 100 parts Epoxidized soybean oil 1 part Acetyl tributyl citrate 0.5 parts EVA (VAc 40%, M.I. 75 g/10 min.) 4 parts | 148 | 0.90 |

EXAMPLE 1

Two extruders were used. By the method of manufacture described earlier in this specification, a parison of a layer construction of $D_1$/VDC-1/$D_1$ was prepared. Then, the parison on the verge of cold drawn orientation was heated to 42° C. and subjected to low-temperature drawing by the bubble orientation process to 340% in the direction of length and 360% in the direction of width to produce a tubular film having a folded width of 400 mm and a thickness of 60μ ($D_1$/VDC-1/$D_1$ = 25/10/25). (Test specimen No. 1)

The procedure described above was repeated, with the proportions and types of Resin A, Resin B and Resin C in Resin D varied as indicated in Table 1. The films thus produced were registered as Test Specimen Nos. 2-32. These test specimens were tested for low-temperature shrinkage properties, seal strength properties, dart impact strength, and adaptability for co-extrusion and cold drawing property by the respective methods described earlier in the specification. Based on the results of the tests, they were subjected to overall evaluation. The results are shown in Table 1.

It is seen from Table 1 that, for Resin D to be compatible with the vinylidene chloride type resin, it is required to be a mixture of the three resins, Resins A, B and C and that a mixture of any two of the three resins mentioned above is deficient in adaptability for co-extrusion and cold drawing property or seal strength properties.

FIG. 1 graphically shows the results of the overall evaluation of Table 1, with respect to the percentage composition of the components making up the resins under discussion.

From FIG. 1 which represents the components of resins compatible with the vinylidene chloride type resins in a tertiary coordinate system indicating such components in the form of points (Components A, B and C), it is seen that the components satisfying the requirements of this invention should fall within the pentagonal area formed by connecting the points, a (90, 5, 5), b (45, 5, 50), d (20, 30, 50), e (20, 50, 30) and f (45, 50, 5) with straight lines. The graphic data verbally indicate the Component A should account for a proportion within the range of from 90 to 20% by weight, Component B within the range of from 50 to 5% by weight and Component C within the range of from 50 to 5% by weight, respectively based on the total of the three components taken as 100% by weight.

Then, the tests shown in Table 1 were repeated except that the vinylidene chloride type resin VDC-1 was changed to $E_2$. As the result, the physical properties were observed to change crossing the five sides of the pentagonal area of FIG. 1.

zigzag hazing occurred in Test II (conditions for rapid shrinkage).

FIG. 4 graphically shows the results of Test I for zigzag hazing given in Table 2, with respect to the percentage components making up Resin D.

From FIG. 4 which represents the components of Resin Dx effective in preventing the phenomenon of zigzag hazing under conditions for gradual shrinkage, those of Resin A (which may be formed of a vinyl ester and a copolymer of ethylene and an alkyl ester of an unsaturated aliphatic carboxylic acid) and those of Resins B and C in a ternary coordinates system indicating such components in the form of points (Components A, B and C), it is seen that the components satisfying the requirements of this invention should fall within the pentagonal area formed by connecting the points, a (90, 5, 5), g (65, 5, 30), h (50, 20, 30), i (50, 30, 20) and j (65, 30, 5) with straight lines.

TABLE 1

| Test specimen No. | Resin D A | Resin D B | Resin D C | Proportion (wt %) A | Proportion (wt %) B | Proportion (wt %) C | Low-temperature shrinkage properties Shrinkage | Low-temperature shrinkage properties Shrink tension | Seal strength properties | Dart impact strength | Adaptability for coextrusion and cold drawing | Overall evaluation |
|---|---|---|---|---|---|---|---|---|---|---|---|---|
| 2 | $A_1$ | $B_1$ | $C_1$ | 95 | 0 | 5 | — | — | — | — | X | X |
| 3 | " | " | " | 95 | 5 | 0 | O | △ | X | O | △ | X |
| 1 | " | " | " | 90 | 5 | 5 | ◎ | ◎ | O | O | O | O |
| 4 | " | " | " | 70 | 3 | 27 | ◎ | O | O | △ | △ | △ |
| 5 | " | " | " | 70 | 15 | 15 | ◎ | ◎ | O | ◎ | ◎ | ◎ |
| 6 | " | " | " | 70 | 27 | 3 | O | △ | △ | ◎ | △ | △ |
| 7 | " | " | " | 55 | 20 | 25 | ◎ | ◎ | ◎ | ◎ | ◎ | ◎ |
| 8 | " | " | " | 50 | 0 | 50 | — | — | — | — | X | X |
| 9 | " | " | " | 50 | 50 | 0 | O | △ | X | ◎ | △ | X |
| 10 | " | " | " | 45 | 5 | 50 | O | O | ◎ | O | O | O |
| 11 | " | " | " | 45 | 50 | 5 | O | O | O | ◎ | ◎ | O |
| 12 | " | " | " | 40 | 20 | 40 | ◎ | ◎ | ◎ | ◎ | ◎ | ◎ |
| 13 | " | " | " | 40 | 35 | 25 | ◎ | ◎ | ◎ | ◎ | ◎ | ◎ |
| 14 | " | " | " | 20 | 30 | 50 | O | O | O | O | O | O |
| 15 | " | " | " | 20 | 50 | 30 | ◎ | ◎ | ◎ | ◎ | O | O |
| 16 | " | " | " | 15 | 30 | 55 | △ | △ | ◎ | △ | △ | △ |
| 17 | " | " | " | 13 | 55 | 32 | O | O | △ | ◎ | △ | △ |
| 18 | " | " | " | 0 | 40 | 60 | — | — | — | — | X | X |
| 19 | $A_2$ | " | " | 70 | 15 | 15 | ◎ | ◎ | ◎ | ◎ | ◎ | ◎ |
| 20 | " | " | " | 50 | 35 | 15 | ◎ | ◎ | ◎ | ◎ | ◎ | ◎ |
| 21 | " | " | " | 40 | 20 | 40 | ◎ | ◎ | ◎ | ◎ | ◎ | ◎ |
| 22 | $A_3$ | " | " | 70 | 15 | 15 | ◎ | ◎ | ◎ | ◎ | ◎ | ◎ |
| 23 | " | " | " | 40 | 20 | 40 | ◎ | ◎ | ◎ | O | ◎ | ◎ |
| 24 | " | " | " | 30 | 30 | 40 | ◎ | ◎ | ◎ | ◎ | ◎ | ◎ |
| 25 | $A_5$ | " | " | 70 | 15 | 15 | ◎ | ◎ | ◎ | ◎ | ◎ | ◎ |
| 26 | $A_6$ | " | " | 40 | 20 | 40 | ◎ | ◎ | ◎ | ◎ | ◎ | ◎ |
| 27 | $A_1$ | $B_2$ | " | 70 | 15 | 15 | ◎ | ◎ | ◎ | ◎ | ◎ | ◎ |
| 28 | " | " | " | 60 | 10 | 30 | ◎ | ◎ | ◎ | ◎ | ◎ | ◎ |
| 29 | " | " | " | 40 | 20 | 40 | ◎ | ◎ | ◎ | ◎ | ◎ | ◎ |
| 30 | " | $B_1$ | $C_2$ | 70 | 15 | 15 | ◎ | ◎ | ◎ | ◎ | ◎ | ◎ |
| 31 | " | " | " | 40 | 20 | 40 | ◎ | ◎ | ◎ | ◎ | ◎ | ◎ |
| 32 | " | " | " | 30 | 40 | 30 | ◎ | ◎ | ◎ | ◎ | ◎ | ◎ |

EXAMPLE 2

A tubular film having a folded width of 400 mm and a thickness of 60μ ($D_2$/VDC-1/$D_2$=25/10/25) was obtained by the method described earlier in the specification. (Test Specimen No. 33)

The same procedure was repeated, with the proportions and types of Resins A, B and C in Resin C varied as indicated in Table 2. The films thus produced were registered as Test Specimen Nos. 34–44. They were tested for zigzag hazing, with Test Specimen Nos. 3, 5, 19, 27 and 30 of Example 1 similarly tested for the purpose of comparison.

From Table 2, it is seen that no zigzag hazing occurred in Test I (conditions for gradual shrinkage) and These graphic data verbally indicate that Component A should account for a proportion within the range of from 90 to 50% by weight, Component B within the range of from 30 to 5% by weight and Component C within the range of from 30 to 5% by weight, respectively based on the total of the three components taken as 100% by weight.

Then, the tests shown in Table 2 were repeated except that the vinylidene chloride type resin VDC-1 was changed to $E_2$. As the result the physical properties were observed to change crossing the five sides of the pentagonal area of FIG. 1.

EXAMPLE 3

A tubular film of a layer construction of $Dx_1/E_1/Dx_1$ 400 mm in folded width and $60\mu$ in thickness ($Dx_1/E_1/Dx_1=25/10/25$) was obtained by the method described earlier in the specification. (Test Specimen No. 45)

The same procedure was repeated, with the proportions and types of the components of Resin E varied as indicated in Table 3. The films thus produced were registered as Test Specimen Nos. 46–52. They were tested for low-temperature shrinkage properties, dart impact strength, gas barrier property, zigzag hazing and fluctuation in thickness and width, with Test Specimen No. 5 of Example 1 similarly tested for the purpose of comparison. Based on the results of these tests, the test specimens were subjected to overall evaluation. The results are shown in Table 3.

It is seen from Table 3 that proper selection of VDC resins is essential for satisfying Test I (under conditions of gradual shrinkage) and Test II (under conditions of rapid shrinkage) for zigzag hazing.

Specifically it is clear that Resin E which satisfies the requirements of this invention has crystal melting peak value at a temperature within the range of from 140° to 155° C. as measured by the DSC method and solution viscosity within the range of from 0.85 to 1.05 c.p.

Test Specimen Nos. 46 and 49 which had undergone Test II for zigzag hazing were cut in the direction of thickness. Their cross sections, particularly of the vinylidene chloride type resin layers and adjoining layers, were photographed in an enlarged scale. The photographs are shown in FIGS. 2 and 3 respectively. Comparison of the two photographs reveals that the vinylidene chloride type resin layer is flat in FIG. 2 and it is deformed in a zigzag in FIG. 3.

EXAMPLE 4

A tubular film of a layer construction of $D_3/E_2/D_3$ 400 mm in folded width and $60\mu$ in thickness ($D_3/E_2/D_3=25/10/25$) was obtained by the method described earlier in the specification. (Test Specimen No. 53)

The same procedure was repeated, with the number of extruders varied between 2 and 4 as occasion demanded, to obtain films of layer constructions indicated in Table 4. The films thus obtained were registered as Test Specimen Nos. 54–68. They were tested for low-temperature shrinkage properties, zigzag hazing, gas barrier property and dart impact strength, with Test Specimen No. 46 similarly tested for the purpose of comparison. The results are shown in Table 4.

It is seen from Table 4 that the combination of components capable of passing both Tests I and II for zigzag hazing is that of Dx/E/Dx.

Comparison of the results of Test Specimen No. 53 with those of Test Specimen Nos. 5 and 43 given in Table 2 reveals that Resin E is more effective in the prevention of zigzag hazing than Resin Dx.

When the thickness of Resin E layer is less than $5\mu$, the layer is deficient in gas barrier property. When the proportion of the thickness of Resin E layer to the total thickness of all the component layers exceeds 35%, the layer is degraded in low-temperature shrinkage properties and dart impact strength. Thus, the thickness of Resin E layer is required to fall within the range of from 5 to $25\mu$ and the component layers to be combined are required to be given thickness such that the proportion of Resin E layer to the total thickness of all the component layers falls within the range of from 5 to 35%.

EXAMPLE 5

A tubular film of a layer construction of $A_4/Dx_1/E_2/Dx_1$ 400 mm in folded width and $60\mu$ in thickness was obtained by using three extruders and following the method described earlier in the specification. (Test Specimen No. 69)

The same procedure was repeated, with the number of extruders varied between 2 and 4, to obtain films of layer constructions indicated in Table 5. They were registered as Test Specimen Nos. 70–79. The films were tested for low-temperature shrinkage properties, seal strength, gloss and haze. The results are collectively shown in Table 5.

It is clear from Table 5 that the films of layer construction Dx/E/Dx are not quite satisfactory in terms of seal strength and that the strength is improved by additionally incorporating into the films a surface layer of Resin C. It is seen that gloss and haze of the films are improved by incorporating a surface layer of Resin A.

For the surface layer to manifest its effect fully, it is required to have a thickness of not less than $2\mu$. When the thickness exceeds $25\mu$, however, the low-temperature shrinkage properties are impaired. It is further evident that the surface layer fulfils its function most effectively when the proportion of the thickness of this layer to the total thickness, 30 to $100\mu$, of all the component layers falls within the range of from 5 to 40%.

EXAMPLE 6

Films conforming to this invention and heat shrinkage multilayered packaging films currently available on the market were tested for all the properties by the respective methods described earlier in the specification. The results of the tests were evaluated. The results are shown in Table 6.

The films used herein were as follows:
Commercial product A of Producer A
  (Test Specimen No. 84)
Commercial product B of Producer B
  (Test Specimen No. 85)
Trial manufacture of Asahi-Dow, Ltd.
  (Test Specimen No. 86)
Films of this invention, by Asahi-Dow, Ltd.
  (Test Specimen Nos. 80 and 81)

The results of Table 6 indicate that the films of this invention earn better marks in all the items of evaluation than the commercial products, demonstrating that the films of this invention excel the commercial products.

Of the data given in Table 6 under the various items of evaluation, those of low-temperature shrinkage properties (shrinkage and shrink tension) and dart impact strength for Test Specimen Nos. 46 and 80 are indicated in FIG. 5, FIG. 6 and Table 7.

The films which were prepared by substituting the vinylidene chloride type resin $E_7$ for $E_2$ of Test Specimen Nos. 80 and 81 exhibited the same properties as Test Specimen Nos. 80 and 81 shown in Table 6. The layer delamination of $E_7$ and $Dx_1$ was much better than that of Test Specimen Nos. 80 and 81.

The results contained in Table 7 indicate that the multilayered films conforming the present invention exhibit higher degrees of dart impart strength than the commercially available films, demonstrating that the films of this invention are useful.

The high dart impact strength exhibited by the films of this invention has never been attained by any of the conventional multilayered films using vinylidene chloride type resins. It forms one of the characteristics of the films of this invention.

EXAMPLE 7

The commercial products A and B and the films of the present invention (Test Specimen 80 and 81) were subjected to practical packaging test, with the results of the test compared. The conditions for evaluation were as follows:

(Conditions for field packaging)

Size of bag: 400 mm in folded width×900 mm in length
Sample size: 20 bags each
Content: Raw beef (15 kg of limb/bag)
Kind of seal
 (1) Aluminum wire clip (10 bags)
 (2) Heat seal (10 bags) (with an opening tucked triply)
Heating condition
 (1) 80° C.×4 seconds for seal by clipping
 (2) 90° C.×4 seconds for seal by heating (Items of evaluation and conditions)

Appearance of package (visual evaluation)
 (1) Condition of wrinkles and sagging formed on package
 (2) Appearance of content through package
 (3) Occurrence of drops after two days' standing
Airtightness of bag at sealed portion—A given package was kept in a room at 1° C. and allowed to stand therein until the vacuum was spoiled. The number of days preceded the destruction of vacuum and the number of bags which lost vacuum were noted for evaluation.
Drop-bag strength—In a room kept at 1° C., a given package adjusted in advance to 1° C. was dropped to the floor from a height of 1 m. The dropping of the bag was repeated until the bag sustained pinholes or breakage. The number of drops was noted for evaluation.

The results obtained are shown in Table 8.

The results contained in Table 8 indicate that the films of the present invention, when used for wrapping articles such as raw meat which abhor heat, shrink tightly on the contents at low temperatures to give packages which enjoy good appearance, withstand shocks of handling and transportation at low temperatures and retain contents fresh for a long time, demonstrating that the films are highly useful for packaging.

EXAMPLE 8

The multilayered film of Test Specimen No. 80 of Example 6 was reproduced, with the additives to Resin E varied. The reproduced film was subjected to a prolonged test for gas barrier property, to note possible changes of film in the course of aging. (Test Specimen No. 87) The procedure was repeated on Test Specimen Nos. 46, 80, 81 and 88. The results are shown in Table 9.

The films retained their high gas barrier property completely intact after two weeks' aging at 25° C.

TABLE 9

| Test specimen No. | Layer construction | Thickness ($\mu$) | Gas barrier property *1 | |
|---|---|---|---|---|
| | | | Just after formation of film | After aging *2 |
| 46 | $Dx_1/E_2/Dx_1$ | 25/10/25 | 8.8 | 8.8 |
| 80 | $D_3/Dx_1/E_2/Dx_1/D_3$ | 15/5/10/5/25 | 9.6 | 9.6 |
| 81 | $A_4/Dx_1/E_2/Dx_1/A_4$ | 6/10/10/19/15 | 9.2 | 9.2 |
| 87 | $D_3/Dx_1/E_6/Dx_1/D_3$ | 15/5/10/5/25 | 9.6 | 9.6 |
| 88 | $A_4/Dx_1/E_7/Dx_1/A_4$ | 6/10/10/28/6 | 10.5 | 10.5 |

*1 - Permeability to oxygen, cc/25 $\mu$/m².24 hr.atm at 23° C. (calculated for barrier layer thickness)
*2 - Two weeks' aging at 25° C.

According to Table 9, the films of the present invention exhibit high gas barrier property from immediately after film formation and suffer the property to degrade very little in the course of aging (10% at most). This good retention of the high gas barrier property forms one of the characteristics of the films. This characteristic implies long preservation of their contents. The fact that palsticizers are contained in very small amounts in the component layers from the beginning and they are given little freedom of bleeding from one to another layer also contributes to the food hygiene of the packaging films provided by this invention.

What is claimed is:

1. A low-temperature shrinkage, gas-barrier film comprising a multilayered film having at least a three-layered construction represented by the combination of Resins D/E/D wherein:
 Resin D is a mixture of 50 to 90% by weight of a Resin A which is a copolymer of ethylene and a vinyl ester or an alkyl ester of an unsaturated aliphatic carboxylic acid, 5 to 30% by weight of a Resin B which is an ethylene-α-olefin copolymer having a density of not more than 0.91 g/cm³ and a Vicat softening point of not more than 70° C., and 5 to 30% by weight of a Resin C which is a crystalline polypropylene or crystalline polybutene-1 or a mixture of the two polymers, and
 resin E is a vinylidene fluoride copolymer exhibiting a crystal melting peak at a temperature within the range of from 140° to 155° C. as measured by the DSC method and a solution viscosity of from 1.05 to 0.85 c.p., the total thickness of the multilayered film being 30 to 100$\mu$ and the resin E layer having a thickness within the range of from 5 to 25$\mu$ and accounting for a proportion within the range of from 5 to 35% of the total thickness.

2. The multilayered film according to claim 1, wherein Resin A is a copolymer having an ethylene content within the range of 88 to 98 mol% and melt index within the range of from 0.2 to 10 g/10 minutes.

3. The multilayered film according to claim 1, wherein Resin B is a thermoplastic elastomer consisting of 40 to 93 mol% of ethylene and 60 to 7 mol% of an α-olefin component which is preponderantly formed of propylene or butene-1, said elastomer having melt index within the range of from 0.1 to 10 g/10 minutes.

4. The multilayered film according to claim 2, wherein Resin B is a thermoplastic elastomer consisting of 40 to 93 mol% of ethylene and 60 to 7 mol% of an α-olefin component which is preponderantly formed of propylene or butene-1, said elastomer having a melt index within the range of from 0.1 to 10 g/10 minutes.

5. The multilayered film according to claim 1, wherein Resin C is a rigid polymer having a Vicat softening point of not less than 100° C.

6. The multilayered film according to claim 2, wherein Resin C is a rigid polymer having a Vicat softening point of not less than 100° C.

7. The multilayered film according to claim 3, wherein Resin C is a rigid polymer having a Vicat softening point of not less than 100° C.

8. The multilayered film according to claim 4, wherein Resin C is a rigid polymer having a Vicat softening point of not less than 100° C.

9. The multilayered film according to claim 1, wherein the D layer on at least one surface of the E layer comprises two to three layers of severally different components selected from the components making up Resin D.

10. The multilayered film according to any of claim 2, 3, 4, 5, 6, 7 or 8, wherein the D layer on at least one surface of the E layer comprises two to three layers of severally different components selected from the components making up Resin D.

11. The multilayered film according to any of claim 1, 2, 3, 4, 5, 6, 7, 8 or 9, wherein the permeability of the film to oxygen is not more than 20 cc/25μ thick E layer/m².24 hr.atm at 23° C.

12. The multilayered film according to any of claim 1, 2, 3, 4, 5, 6, 7, 8 or 9, wherein the change is the film's permeability to oxygen after two weeks' aging at 30° C. is not more than 10%.

13. The multilayered film according to any of claim 1, 2, 3, 4, 5, 6, 7, 8 or 9, wherein the heat shrinkage of the film is not less than 18% and 25% respectively at 70° C.×4 sec and 80° C.×4 sec.

14. The multilayered film according to any of claim 1, 2, 3, 4, 5, 6, 7, 8 or 9, wherein the peak value of heat shrink tension falls at a temperature within the range of from 60° to 80° C.

15. The multilayered film according to any of claim 1, 2, 3, 4, 5, 6, 7, 8 or 9, wherein the peak value of heat shrink tension is not less than 100 g/mm².

16. The multilayered film according to any of claim 1, 2, 3, 4, 5, 6, 7, 8 or 9, wherein the dart impact strength of the film is not less than 150 kg.cm as calculated for the film thickness of 60μ at 5° C.

17. A low-temperature shrinkage, gas-barrier film comprising a multilayered film having at least a four-layered construction represented by the combination of resins (D/E/D/A or C) or (A or C/D/E/D/A or C) wherein:

Resin A is a copolymer of ethylene and a monomer selected from the group consisting of vinyl esters, unsaturated aliphatic carboxylic acids and alkyl esters of unsaturated aliphatic carboxylic acids or a metal-crosslinked copolymer of ethylene and said selected monomer or a mixture of such copolymers, Resin B is an ethylene-α-olefin copolymer having a density of not more than 0.91 g/cm³ and Vicat softening point of not more than 70° C., Resin C is a crystalline polypropylene or a crystalline polybutene-1 or a mixture of the two polymers, Resin D is a mixture of 50 to 90% by weight of a copolymer of ethylene and a vinyl ester or an alkyl ester of an unsaturated aliphatic carboxylic acid, 5 to 30% by weight of Resin B and 5 to 30% by weight of Resin C, and Resin E is a vinylidene chloride copolymer exhibiting a crystal melting peak value at a temperature within the range of from 140° to 155° C. as measured by the DSC method and a solution viscosity within the range of from 1.05 to 0.85 c.p., the total thickness of the multilayered film being 30 to 100μ, said Resin E layer having a thickness of from 5 to 25μ and accounting for a proportion of from 5 to 35% of the total thickness and said A or C layer having a thickness of from 2 to 25μ and accounting for a porportion within the range of from 5 to 40% of the total thickness.

18. The multilayered film according to claim 17, wherein Resin A is a copolymer having an ethylene content within the range of 88 to 98 mol% and a melt index within the range of from 0.2 to 10 g/10 minutes.

19. The multilayered film according to claim 17, wherein Resin B is a thermoplastic elastomer consisting of 40 to 93 mol% of ethylene and 60 to 7 mol% of an α-olefin component which is preponderantly formed of propylene or butene-1, said elastomer having a melt index within the range of from 0.1 to 10 g/10 minutes.

20. The multilayered film according to claim 18, wherein Resin B is a thermoplastic elastomer consisting of 40 to 93 mol% of ethylene and 60 to 7 mol% of an α-olefin component which is preponderantly formed of propylene or butene-1, said elastomer having a melt index within the range of from 0.1 to 10 g/10 minutes.

21. The multilayered film according to claim 17, wherein Resin C is a rigid polymer having a Vicat softening point of not less than 100° C.

22. The multilayered film according to claim 18, wherein Resin C is a rigid polymer having a Vicat softening point of not less than 100° C.

23. The multilayered film according to claim 19, wherein Resin C is a rigid polymer having a Vicat softening point of not less than 100° C.

24. The multilayered film according to claim 20, wherein Resin C is a rigid polymer having a Vicat softening point of not less than 100° C.

25. The multilayered film according to claim 17, wherein the D layer on at least one surface of the E layer comprises two to three layers of severally different components selected from the components making up Resin D.

26. The multilayered film according to any of claim 18, 19, 20, 21, 22, 23 or 24, wherein the D layer on at least one surface of the E layer comprises two to three layers of severally different components selected from the components making up Resin D.

27. The multilayered film according to any of claim 17, 18, 19, 20, 21, 22, 23, 24 or 25, wherein the permeability of the film to oxygen is not more than 20 cc/25μ thick E layer/m².24 hr.atm at 23° C.

28. The multilayered film according to any of claim 17, 18, 19, 20, 21, 22, 23, 24 or 25, wherein the change in the film's permeability to oxygen after two weeks' aging at 30° C. is not more than 10%.

29. The multilayered film according to any of claim 17, 18, 19, 20, 21, 22, 23, 24 or 25, wherein the heat shrinkage of the film is not less than 18% and 25% respectively at 70° C.×4 sec and 80° C.×4 sec.

30. The multilayered film according to any of claim 17, 18, 19, 20, 21, 22, 23, 24 or 25, wherein the peak value of heat shrink tension falls at a temperature within the range of from 60° to 80° C.

31. The multilayered film according to any of claim 17, 18, 19, 20, 21, 22, 23, 24 or 25, wherein the peak value of heat shrink tension is not less than 100 g/mm².

32. The multilayered film according to any of claim 17, 18, 19, 20, 21, 22, 23, 24 or 25, wherein the dart impact strength of the film is not less than 150 kg.cm as calculated for the film thickness of 60μ at 5° C.

* * * * *

UNITED STATES PATENT AND TRADEMARK OFFICE
CERTIFICATE OF CORRECTION

PATENT NO. : 4,390,587
DATED : June 28, 1983
INVENTOR(S) : YOSHIMURA ET AL

It is certified that error appears in the above-identified patent and that said Letters Patent are hereby corrected as shown below:

Column 28, line 43: "fluoride" should read --chloride--.

Signed and Sealed this

Twenty-ninth Day of May 1984

[SEAL]

Attest:

GERALD J. MOSSINGHOFF

Attesting Officer

Commissioner of Patents and Trademarks